United States Patent
Li

(10) Patent No.: US 7,943,869 B2
(45) Date of Patent: May 17, 2011

(54) LIGHTNING RESISTIVE AND MANUFACTURE PROCEDURE

(76) Inventor: Lianjun Li, Taipei (TW)

( * ) Notice: Subject to any disclaimer, the term of this patent is extended or adjusted under 35 U.S.C. 154(b) by 487 days.

(21) Appl. No.: 12/231,424

(22) Filed: Aug. 18, 2008

(65) Prior Publication Data

US 2009/0000820 A1    Jan. 1, 2009

(30) Foreign Application Priority Data

Jul. 10, 2006   (CN) .......................... 2006 1 0036410

(51) Int. Cl.
*H02G 3/18* (2006.01)
(52) U.S. Cl. .............. 174/650; 174/51; 174/6; 439/100; 361/799
(58) Field of Classification Search .................. 174/650, 174/51, 6, 2, 4 R; 264/279.1; 439/98, 100; 361/799
See application file for complete search history.

(56) References Cited

U.S. PATENT DOCUMENTS

| | | | |
|---|---|---|---|
| 7,055,868 B2 * | 6/2006 | Watanabe | 285/249 |
| 7,673,770 B2 * | 3/2010 | Summerfield | 220/755 |
| 7,723,622 B2 * | 5/2010 | Dukes et al. | 174/650 |
| 7,772,506 B2 * | 8/2010 | Suter et al. | 174/650 |

\* cited by examiner

*Primary Examiner* — Dhiru R Patel

(57) ABSTRACT

A lightning resistive bush body includes a cylindrical bush body. The bush body is composed of an inner insulative layer, a center electric-magnetic absorbing metal layer and an outer insulative layer, wherein the inner insulative layer, the center electric-magnetic absorbing metal layer and the outer insulative layer is integrated, and the center electric-magnetic absorbing is provided between the inner insulative layer and the outer insulative layer, and two axial edges of the center electric magnetic absorbing metal layer shape having radial openings.

1 Claim, 6 Drawing Sheets ed inner and outer insulative layers on said inner and outer surfaces of said center electric-magnetic absorbing metal layer respectively and, said pre-fabricated center electric-magnetic absorbing metal layer is sealed off. Thus, said lightning resistive bush body is integrally formed.

LIGHTNING RESISTIVE AND MANUFACTURE PROCEDURE

FIELD OF THE INVENTION

The present invention is to provide a lightning resistive bush body and manufacturing procedure.

BACKGROUND OF THE INVENTION

At lightning technologies, downleads and lighting resistive bush bodies applied to buildings need to be in consideration of precipitation and electromagnetic pulse (EMP) caused by cloud to ground lightning, which may affect electronic equipment regardless of whether the equipment is switched on or off. Lightning strike may cause electricity spread on surroundings and current flowing through said downleads, electric current overload may damage electronic equipments inside the building. Cumulonimbus can bring lightning to reach the ground, since a streamer of positive charge of the cumulonimbus may reach up a potential difference to be discharged, the lightning seem to flicker. Each bolt has the potential to be as strong as a billion volts with temperatures as high as 54,000 degrees Fahrenheit. During which, static magnetic field (SMF), electromagnetic field, electromagnetic radiation, invaded lightning waves, and return stroke from the ground; all of them, we have come to an understanding, are attributed to physics phenomena explained as lightning electromagnetic pulse. Said electromagnetic pulse has ability to interfere with radio communication and functions of electronic monitoring systems seriously and cause damages to some light-current devices to an extent, electronic equipments operated by a comparatively feeble force, such as video camera, smoke detector and thermal sensor are easily damaged during the lightning.

SUMMARY OF THE INVENTION

Accordingly, the present invention is to provide a lightning resistive bush body and manufacturing procedure for protection of lightning electromagnetic pulse. Since and manufacturing procedure for protection of lightning electromagnetic pulse. Since lightning strikes cause electricity spread on surroundings and current flowing through said downleads, therefore lightning induced overvoltages damage said electronic equipments used with feeble currents inside buildings. The present invention is aimed to alleviate such kinds of damages and risks.

The present invention is to provide a lightning resistive bush body comprising a cylindrical bush body. Said bush body is composed of an inner insulative layer, a center electric-magnetic absorbing metal layer and an outer insulative layer, wherein the inner insulative layer, the center electric-magnetic absorbing metal layer and the outer insulative layer is integrated, and the center electric-magnetic absorbing metal layer is provided between the inner insulative layer and the outer insulative layer, and two axial edges of the center electric magnetic absorbing metal layer are not connected to form cylindrical shape having radial openings.

In addition, a distal end of said inner insulative layer of the bush body is bulged outward in radial direction to be combined with said center electric-magnetic absorbing metal layer to from outer threads; said outer insulative layer at a proximal end of the bush body is also bulged inward in radial direction to be combined with said center electric-magnetic absorbing metal layer to form inner threads; said inner and outer threads can be screwed to each other.

With said inner and outer threads, one bush body can be serially connected to other bush bodies in alignment with one another by screwing.

In use, said bush body is used to fit over said downlead of a device for protection of lightning electromagnetic pulse. Each of said downlead and said center electric-magnetic absorbing metal layer connected ground leads individually, the ground leads readily buried in the ground. When lightning induced overvoltage conducts overload current to flow through said downlead, the electromagnetic field change produced by such a current distribution. Through electromagnetic induction, most of electromagnetic radiation converted into induced electric current and absorbed by the center electric magnetic absorbing metal layer, the induced electric current is further discharged along the center electric magnetic absorbing metal layer to the ground so that minimizing the risks and damages led to said electronic equipments used with feeble current inside the building regardless of whether the equipments are switched on or off. Due to the center electric-magnetic absorbing metal layer is substantially sandwiched between said inner and outer insulative layers, and said center electric-magnetic absorbing metal layer is formed annular in shape; both distal and proximal ends are opened in radial direction with only a little electromagnetic flux leakage. Besides, induced electric current absorbed and discharged by said center electric-magnetic absorbing metal layer may emit low intensity secondary electromagnetic radiation, which is less than cosmic background radiation, assumption behind is that background radiation is harmless. Thus, electronic equipments inside the building are not affected by the emission of said secondary electromagnetic radiation and the like to be avoided from risks and damages.

When manufacturing, long strip of metal sheet can be pre-fabricated as said center electric-magnetic absorbing metal layer, both axial edges of which are not connected with each other to form cylindrical shape. The center electric-magnetic absorbing metal layer can be integrally formed as a cylindrical tube having both proximal and distal open ends opened in radial direction further pressing outer thread profiles on said distal end, pressing inner thread profiles on said proximal end. In addition, both ends opened in radial direction are plated with thin anti-rust film. At the same time, a cast mode for shaping said lightning resistive bush body is arranged, said cast mode is designed in compliance with, for example, the United States established thread standards in 1864 allowed interchangability. Such a cast mode includes an outer mold and a core ring corresponding to said pre-fabricated center electric-magnetic absorbing metal layer. The core ring is formed as two ring circles in step formation, a perimeter of a stepped up ring circle is formed with outer thread profiles conformed to said inner threads at said proximal end of said center electric magnetic absorbing metal layer. Inside an inner cavity of said outer mold is formed as stepped round cavity, an inner perimeter of a tapered, stepped up circle is formed with inner thread profiles conformed to said outer threads at said distal end of said center magnetic absorbing metal layer. Said center electric-magnetic absorbing metal layer is inserted into a cavity inside said cast mode between said outer mold and said core ring, as said outer mold and said core ring are assembled together. Whereby said center electric magnetic absorbing metal layer is properly fit in said cavity of said cast mode with both inner and outer threads of said center electric-magnetic absorbing metal layer screwed to the outer and inner thread profiles of the outer mold and the ring core appeared in the opposite directions in position respectively. A melt insulative material is further injected into said cavity of said cast mode to laminate said inner and outer insulative layers on both front and rear sides of said center electric magnetic absorbing metal layer, where the melt insulative material is retained under a cavity pressure for a cool time. Opening mold, a lightning resistive bush body is finished.

DETAIL DESCRIPTION OF THE PREFERRED EMBODIMENTS OF THE INVENTION

Figure 1:
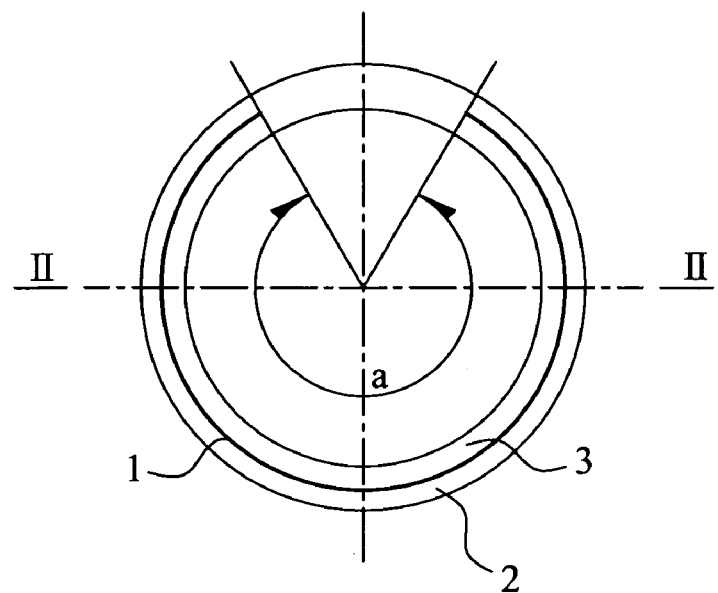
FIG. 1: is a schematic view of the lightning resistive bush body of the first embodiment of the present invention.
Figure 2:
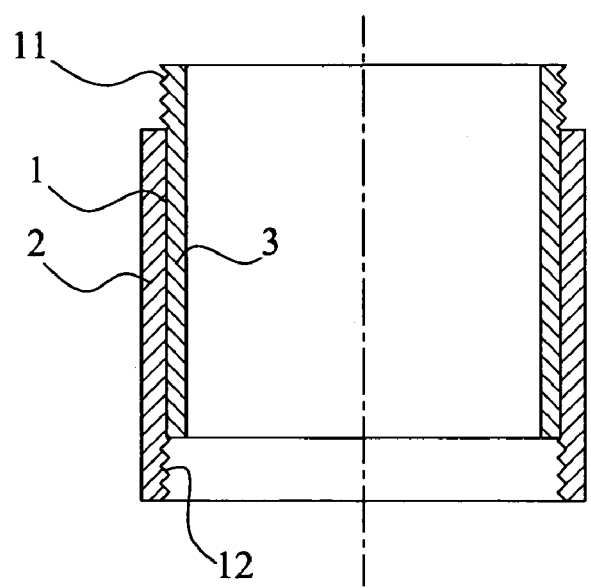
FIG. 2: is a cross-sectional view of the FIG. 1 according to line II-II.
Figure 3:
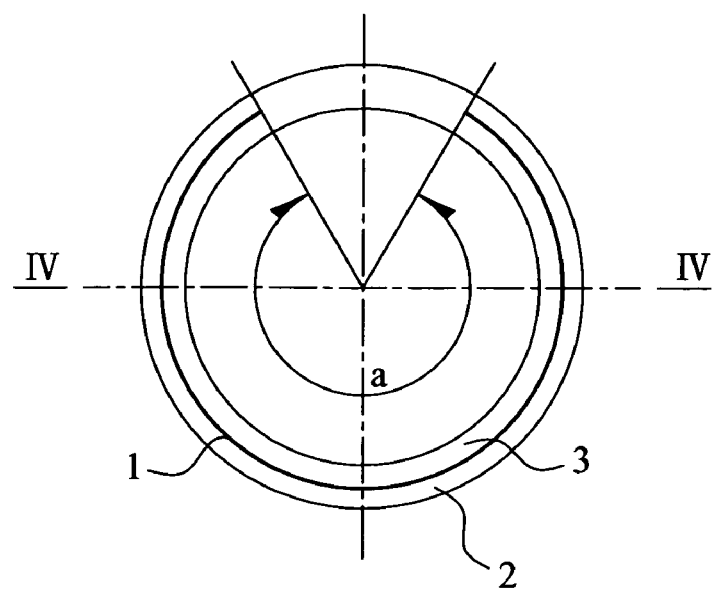
FIG. 3: is a schematic view of the lightning resistive bush body of the second embodiment of the present invention.

The description is described in detail according to the appended drawings hereinafter.

As shown in FIG. 1~FIG. 9, a center electric-magnetic absorbing metal layer (1) is provided between the inner insulative layer (3) and the outer insulative layer (2), and two axial edges of the center electric magnetic absorbing metal layer (1) are not connected to each other to form cylindrical shape, said center electric-magnetic absorbing metal layer (1) is therefore shapes as an integral cylindrical tube having radial openings, that is, both proximal and distal ends are open ends opened in radial direction. Said inner insulative layer (3) at a distal end of the bush body is bulged outward in radial direction to be combined with said center electric-magnetic absorbing metal layer to form outer threads (11); an arc length of said center electric-magnetic absorbing metal layer is no less than a half circle circumference; said outer insulative layer (2) at a proximal end of the bush body is also bulged inward in radial direction to be combined with said center electric-magnetic absorbing metal layer (1) to form inner threads (12); said inner and outer threads (11, 12) can be mutually screwed to each other.

Figure 4:
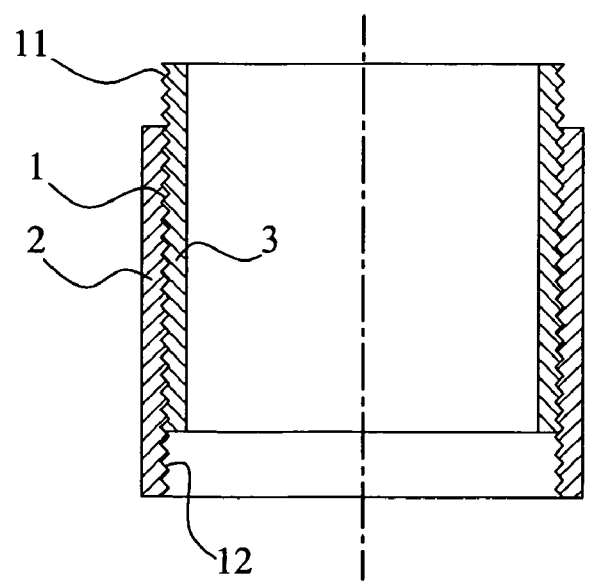
FIG. 4: is a cross-sectional view of the FIG. 3 according to line IV-IV.
Figure 5:
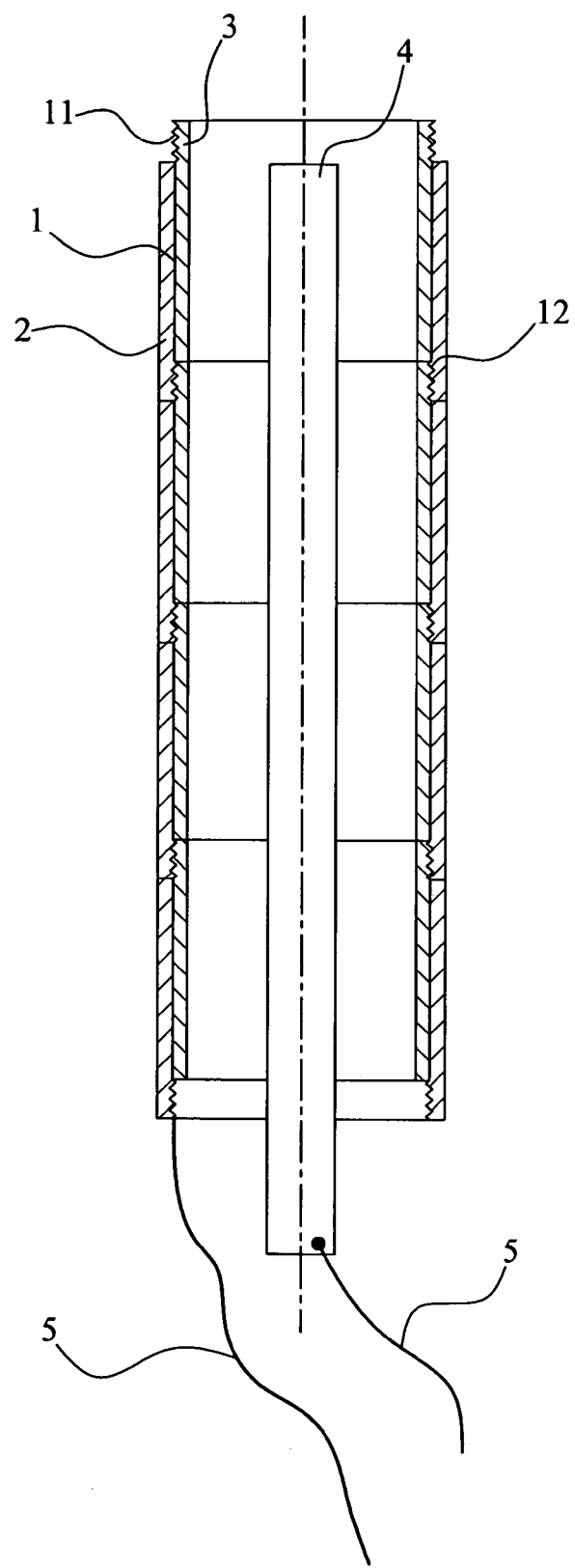
FIG. 5: is a schematic view of the lightning resistive bush body applied to the device for protection of lightning electromagnetic pulse.

As shown in FIG. 4, threads are formed around said center electric magnetic absorbing metal layer (1). When used, the center electric magnetic absorbing metal layer (1) is has a pre-determined size dimensioned, even cut off from the long to add to the short according to the requirements as demanded. And a corresponding portion of said inner insulative layer (2) is trimmed out from said proximal end of said bush body to expose said inner threads (12), a corresponding portion of said outer insulative layer (3) is trimmed out from said distal end of said bush body to expose said outer threads (11).

In practice, the lightning resistive bush body and a downlead can be partially encased in a bed of reinforce concrete within a building base pile. Since the lightning resistive bush body can be serially connected one by one in alignment with one another, extension of said lighting resistive bush body is therefore not limited by a height of said building. With said inner threads (12) of one lightning resistive bush body being screwed to said outer threads (11) of the other lighting resistive bush body, the center electric-magnetic absorbing metal layer (1) is formed annular in shape; both distal and proximal ends are opened. Such a center electric-magnetic absorbing metal layer (1) is flushed with both said inner and outer insulative layers (2, 3) and opposing outward in axial direction. When said lightning resistive bush body fits over said downlead (4) of a device for protection of lightning electromagnetic pulse, said downlead (4) and said center electric-magnetic absorbing metal layer (1) are connected to the ground by ground leads (5) respectively, said ground leads (5) are readily extended into and buried in the ground.

Figure 6:
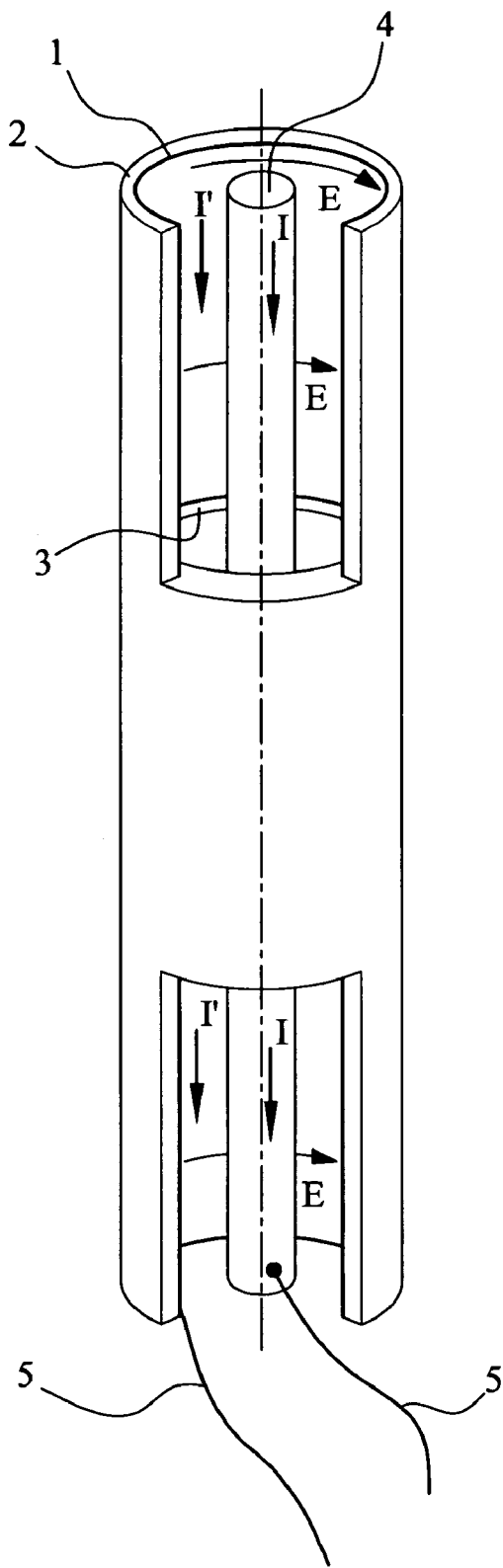
FIG. 6: is a schematic view of the lightning resistive bush body applied to the device for protection of lightning electromagnetic pulse.
Figure 7:
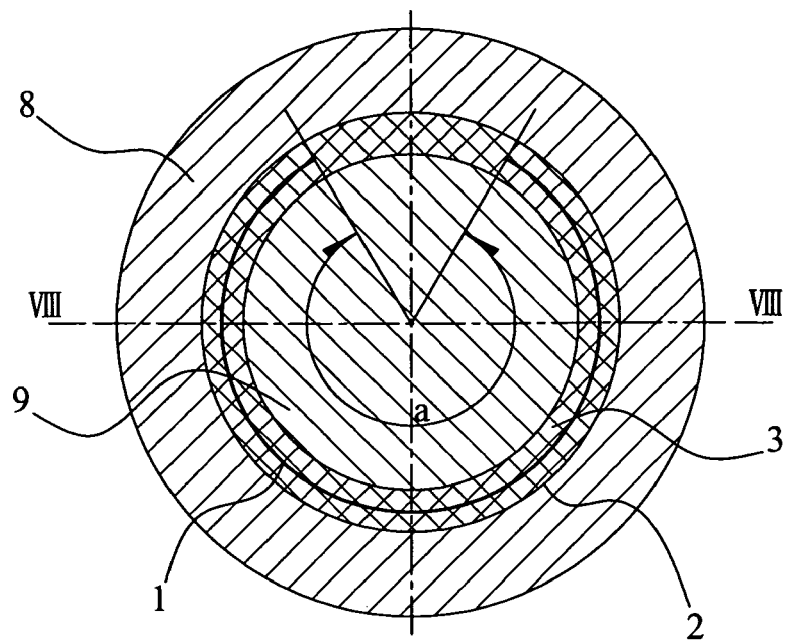
FIG. 7: is a cross-sectional view of injection of said lightning resistive bush body into said cast mode according to line VII-VII of FIG. 8.
Figure 8:
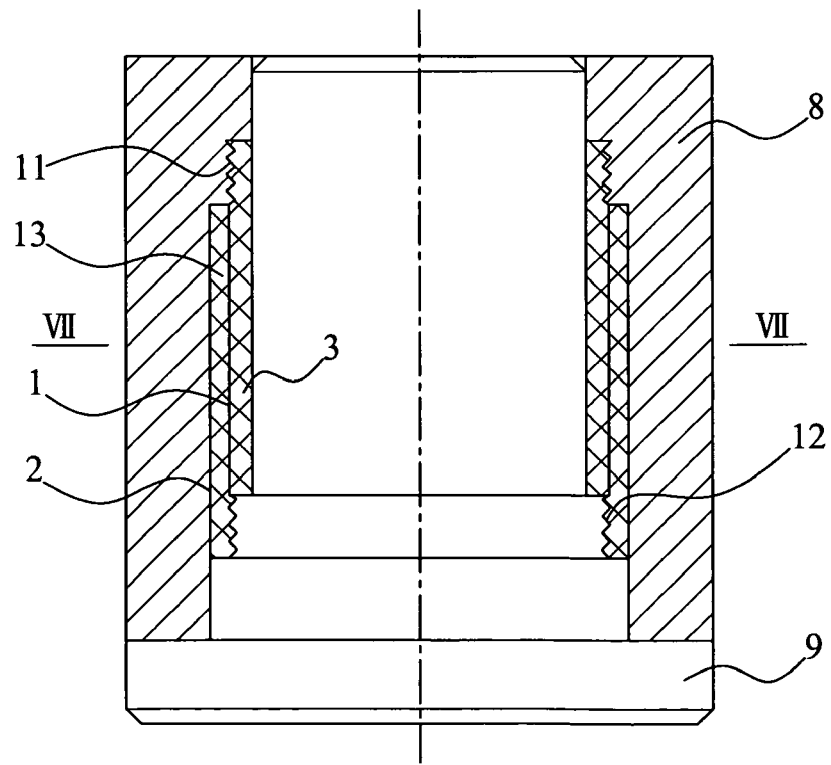
FIG. 8: is a cross-sectional view of the FIG. 7 according to line VIII-VIII of FIG. 7.
Figure 9:
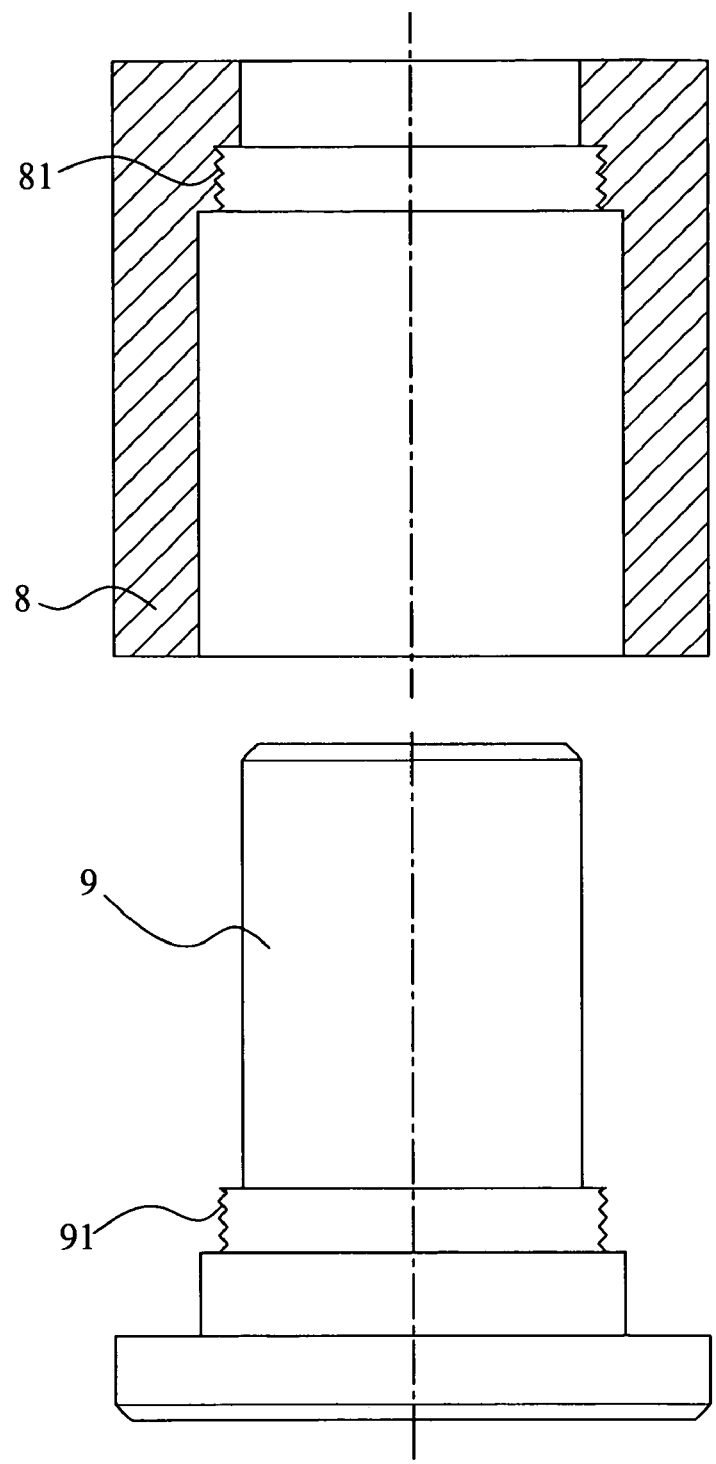
FIG. 9: is an exploded view of the cast mode.

As shown in FIG. 6, when lightning strike causes electricity spread on surroundings and lightning induced overvoltage conducts an electric current overload (I) flowing through said downlead (4), said electric current overload (I) is conducted through said downlead (4) and said ground leads (5) to the ground. Said electric current overload (I) flows through said downlead (4), a current-induced magnetic field (E) is generated. Most of said magnetic field (E) may be absorbed by said center electric magnetic absorbing metal layer (1) and transformed into inductive current (I') leaking out along said center electric magnetic absorbing metal layer (1). Various sensitive electronic equipments inside the building operated by feeble force are avoided from damages caused by lightning electromagnetic pulse. Besides, although the inductive current (I') of the center electric-magnetic absorbing metal layer (1) could emit a little secondary radiation, which will not affect the sensitive electronic equipments inside the building.

Said lightning resistive bush body can also be installed outdoors.

When manufacturing, said center electric-magnetic absorbing metal layer (1) must be pre-fabricated. Such as a long strip of metal sheet can be pre-fabricated as said center electric-magnetic absorbing metal layer (1) pressing said outer threads (11) at said distal end, and pressing said inner threads (12) at said proximal end. Furthermore, both said outer, inner threads (11, 12) are plated with thin anti-rust film. A cast mode is required. Said cast mode includes an outer mold (8) and a core ring (9) corresponding to said pre-fabricated center electric-magnetic absorbing metal layer (1). The core ring (9) is formed as two ring circles in step formation, a perimeter of a stepped up ring circle is formed with outer thread profiles (91) conformed to said inner threads (12) at said proximal end of said center electric magnetic absorbing metal layer (1). Inside an inner cavity of said outer mold (8) is formed as stepped round cavity, an inner perimeter of a tapered, stepped up circle is formed with inner thread profiles (81) conformed to said outer threads (11) at said distal end of said center magnetic absorbing metal layer (1). Said center electric-magnetic absorbing metal layer (1) is inserted into a cavity inside said cast mode between said outer mold (8) and said core ring (9), as said outer mold (8) and said core ring (9) are assembled together. Whereby said center electric magnetic absorbing metal layer (1) is properly fit in said cavity of said cast mode with both inner and outer threads (12, 11) of said center electric-magnetic absorbing metal layer (1) screwed to the outer and inner thread profiles (91, 81) of the core ring (9) and the outer mold (8) appeared in the opposite directions in position respectively. A melt insulative material is further injected into said cavity of said cast mode to form said inner insulative layer (3) and said outer insulative layer (2), where the melt insulative material shaped as inner and outer insulative layers (3, 2), and said center electric magnetic metal layer (1) is therefore sandwiched between inner and outer insulative layers (3, 2) integrally as a whole and retained under a cavity pressure for a cool time. Opening mold, a lightning resistive bush body is finished.

What is claimed is:

1. A lightning resistive bush for protecting electronic equipments comprising a cylindrical bush body; the bush body is composed of an inner insulative layer, a center electric-magnetic absorbing metal layer and an outer insulative layer, said body being fit over a downlead of a device for protection of lighting electromagnetic pulse, each of said device and said center eclectic magnetic absorbing metal layer is connected to ground with an individually ground lead wire, the induced electric current is further discharge along the center electric magnetic absorbing metal layer to the ground so that minimizing the risks and damages led to said electronic equipments; wherein the inner insulative layer, the center electric-magnetic absorbing metal layer and the outer insulative layer is integrated, and the center electric-magnetic absorbing metal layer is provided between the inner insulative layer and the outer insulative layer;

the center electric-magnetic absorbing metal layer is cylindrical with a curvature greater than a half circle circumference and two axial edges thereof form an opening; characterized in that: the outer insulative layer of the bush body is bulged inward and forming inner threads at a proximal end of the bush body; the inner insulative layer of the bush body is also bulged outward and forming outer threads at a distal end of the bush body; said inner and outer threads can be mutually screwed to each other.

* * * * *